US006604413B2

(12) United States Patent
Panek et al.

(10) Patent No.: US 6,604,413 B2
(45) Date of Patent: Aug. 12, 2003

(54) DROP TESTER FOR A FUEL RAIL SEAL GLAND

(75) Inventors: John G. Panek, Churchville, NY (US); Arthur R. Williams, Spencerport, NY (US); Michael Graney, Honeoye Falls, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/941,227

(22) Filed: Aug. 28, 2001

(65) Prior Publication Data

US 2003/0051542 A1 Mar. 20, 2003

(51) Int. Cl.[7] .............................................. G01M 15/00
(52) U.S. Cl. ..................................................... 73/119 A
(58) Field of Search ............................... 123/56.1–56.9, 123/456, 531, 533, 585, 590; 73/119 A

(56) References Cited

U.S. PATENT DOCUMENTS 5,255,658 A * 10/1993 Hoffer et al. ............... 123/531
6,305,335 B1 * 10/2001 O'Toole .................... 123/56.3

* cited by examiner

*Primary Examiner*—Eric S. McCall
*Assistant Examiner*—Monica D. Harrison
(74) *Attorney, Agent, or Firm*—Patrick M. Griffin

(57) ABSTRACT

An acceptance tester for a fuel rail seal gland drops a weight to drive a simulated fuel injector dynamically at the opening of a seal gland to be tested, simulating accurately the mechanics of insertion of an injector into the gland on a production line. The force of insertion may be varied by varying the weight to be dropped, the height from which the weight is to be dropped, or both. A "pass" is indicated when the simulated injector and O-ring are inserted into the gland without damage to the gland or O-ring. A "fail" is indicated when the simulated injector and O-ring either fail to be inserted into the gland or damage the gland during insertion. A maximum acceptance force for a given combination of gland and fuel injector can easily be determined empirically. A continuous process for plating fuel rails may be readily controlled by testing plated glands at statistically significant intervals, permitting operators to accurately monitor plating thickness inferentially.

12 Claims, 1 Drawing Sheet

DROP TESTER FOR A FUEL RAIL SEAL GLAND

TECHNICAL FIELD

The present invention relates to the manufacture of fuel rails for retaining and supplying fuel to fuel injectors on internal combustion engines; more particularly, to devices useful in quality assurance testing of manufactured fuel rails prior to insertion of fuel injectors therein; and most particularly, to a testing apparatus for determining the acceptability of an injector-receptive gland on a fuel rail.

BACKGROUND OF THE INVENTION

The use of fuel injectors to meter fuel to the individual cylinders of a multi-cylinder internal combustion engine is well known. Typically in a modern engine, each fuel injector is mounted in an individual socket or gland of a "fuel rail" which is essentially a manifold formed of tubing in such a configuration that, when the fuel rail is attached to its appropriate engine, each injector is positioned at precisely the correct location for service to its own cylinder. The fuel rail thus supports and positions each injector and also is a reservoir for supplying fuel to each injector upon demand therefrom.

Plated fuel rails and the processes associated with inserting fuel injectors into fuel rail sockets are also well known in the art. A typical fuel injector is an elongate, generally cylindrical device including an elastomeric O-ring disposed in an annular circumferential groove for sealing against the inner wall of a fuel rail seal gland to prevent leakage of fuel past the injector when the fuel rail is full and pressurized. During assembly of the finished fuel rail, the injector insertion process employs sufficient force to compress the O-ring by overcoming the frictional forces that occur between the O-ring and plating on the inner wall of the gland. It is well known in the art that excessive thickness of the plating, caused by normal variation in the plating process, can result in frictional forces that exceed the capability of the insertion tooling. In such events, major disruptions can be created in the sequence of manufacture, which are costly in downtime and materials. Even when insertion is effected, excessive insertion force can result in unacceptable, and sometimes unsuspected, damage to the fuel rail gland, the fuel injector, the O-ring, or combinations thereof.

Several analytical control methods are known in the art which have been employed with varying degrees of success to control and predict the acceptability of plated fuel rail glands. Such methods include static force analysis, surface finish analysis, microscopic visual analysis, and visual transform analysis. All such methods have disadvantages. All except visual transform analysis require very expensive and delicate instrumentation which is easily compromised in a plating environment. Static force analysis can be an inadequate predictor of injector insertion, which is a dynamic process.

What is needed is a simple, repeatable, dynamic test apparatus and method that accurately simulates, and therefore correlates well with, the actual insertion of a fuel injector into a fuel rail gland.

It is a principal object of the present invention to provide a simple, inexpensive, and reliable method and apparatus for acceptance testing of a fuel rail seal gland.

It is a further object of the invention to provide a method and apparatus for acceptance testing of a fuel rail gland that is readily usable in a plating environment.

It is a still further object of the invention to provide such a testing method and apparatus which provides an unambiguous "pass/fail" result.

SUMMARY OF THE INVENTION

Briefly described, an acceptance tester for a fuel rail seal gland drops a weight of predetermined mass under gravity to drive a simulated fuel injector dynamically at the opening of a gland to be tested, simulating accurately the mechanics of insertion of an actual injector into the gland on a production line. The force of insertion may be varied by varying the weight to be dropped, the height from which the weight is dropped, or both. A "pass" is indicated when the simulated injector and O-ring are successfully inserted into the gland without damage to the gland or O-ring. Conversely, a "fail" is indicated when the simulated injector and O-ring fail to be inserted into the gland, are damaged by insertion, or damage the gland during insertion.

A maximum acceptance force for a given combination of gland and fuel injector can easily be determined empirically. A continuous process for plating fuel rails having glands already attached then may be readily controlled by testing plated glands at statistically significant intervals. This permits operators to accurately monitor plating thickness inferentially.

BRIEF DESCRIPTION OF THE DRAWINGS

These and other features and advantages of the invention will be more fully understood and appreciated from the following description of certain exemplary embodiments of the invention taken together with the accompanying drawing, in which.

DESCRIPTION OF THE PREFERRED EMBODIMENTS

Figure 1:
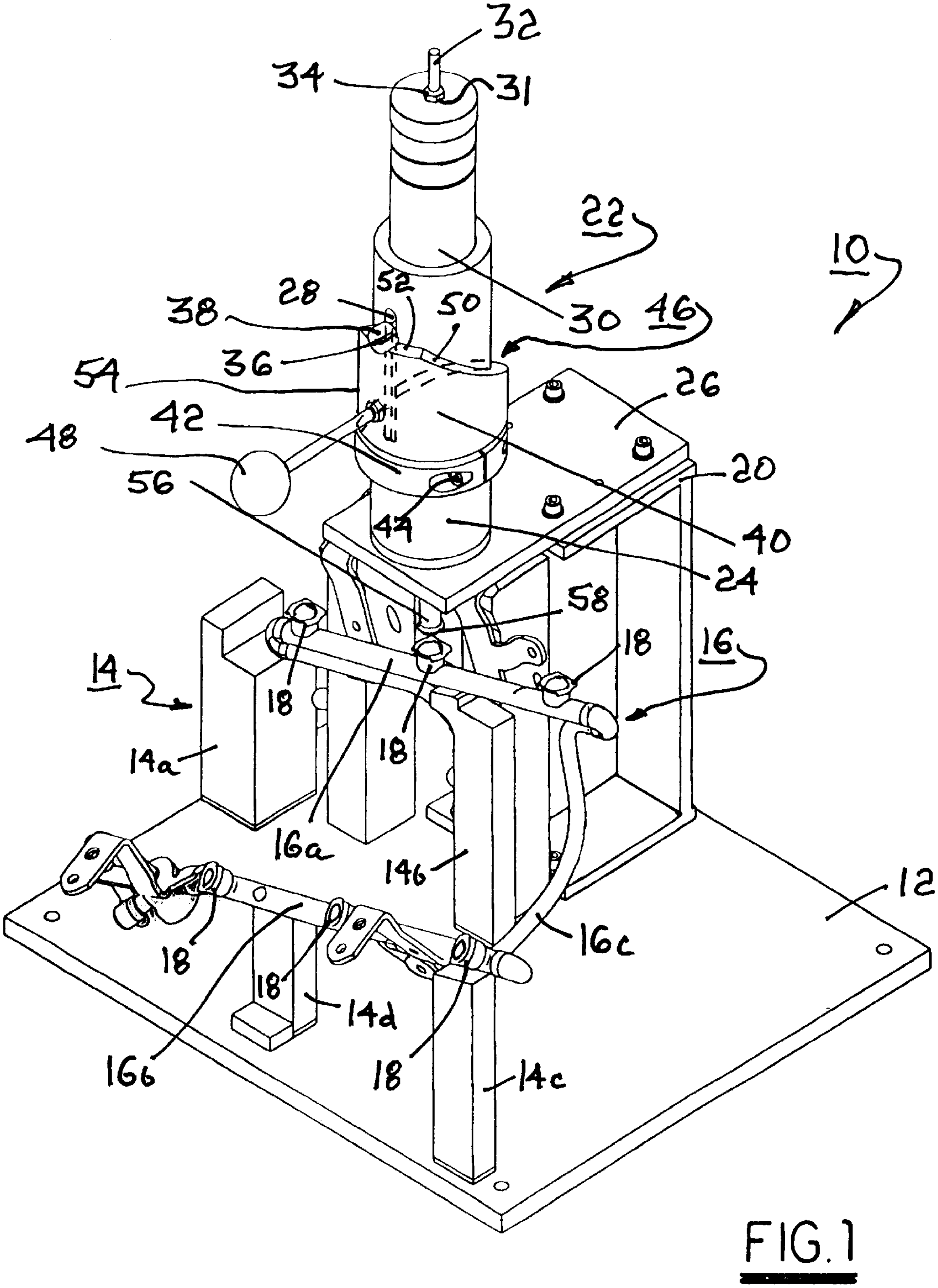
FIG. 1 is an isometric view from above of a fuel rail gland testing apparatus in accordance with the invention.

Referring to FIG. 1, a fuel rail drop tester 10 in accordance with the invention includes a base plate 12 supporting means 14 for holding and positioning a fuel rail 16 for testing. Fuel rail 16 as shown is intended for use on a V-6 gasoline engine and has first bank **16*a* and second bank 16*b* connected by a crossover pipe 16*c*, each bank including three identical glands 18, also known in the art as "sockets" and "pods," each for receiving a separate fuel injector during a subsequent assembly step. Support means 14 in the present embodiment includes four towers 14*a*–14*d*; support means for other configurations of fuel rails can include other numbers and designs of towers or other supportive elements. In addition, the various support means may be moved to other locations on base plate 12 as needed to support the fuel rail in other attitudes for testing of other of glands 18** as desired.

A further tower assembly 20 mounted on base plate 12 supports the drop test apparatus 22 itself. Apparatus 22 includes a tubular, cylindrical barrel 24 mounted on assembly base plate 26 concentric with a bore (not shown) through base plate 26. Barrel 24 is provided with a longitudinal slot 28. A stack of weights 30, totaling a predetermined weight, is mounted via central apertures 31 therein on a central assembly rod 32 and if so desired may be further secured thereupon via threaded fastener (nut) 34. The stack of weights is freely slidable within barrel 24. An actuation rod 36 extends orthogonally from the lowermost of weights 30 through slot 28 and terminates in a cam follower 38. A tubular actuating element 40 having an inner diameter substantially the same as the outer diameter of barrel 24 is mounted concentrically upon the outer surface of barrel 24 for free rotation thereabout. Element 40 rests by gravity on a circular clamp 42 fitted to barrel 24 and axially adjustable along barrel 24 by releasing screw 44, moving the clamp to the desired position, and retightening screw 44. The axial position of element 40 on barrel 24, and therefore the height of weights 30 above base plate 26, is thus adjustable as desired by adjusting clamp 42.

Tubular actuating element 40 is provided with an upper edge surface 46 defining a rotary cam surface for cam follower 38. Element 40 is further provided with an actuation knob 48 whereby element 40 may be rotated about barrel 24. Thus weights 30 are supported on cam follower 38, and the vertical position of the weights is determined by the rotational position of cam surface 46. Thus both the total weight and the height of the weights can be varied independently.

Cam surface 46 is provided with a raising ramp portion 50 continguous with a detent portion 52 for stably supporting the weights in an elevated position, as shown in FIG. 1. Further rotation of knob 48 to the right moves cam surface 46 past detent portion 52 to a vertical portion 54 substantially parallel to the axis of barrel 24.

A simulated fuel injector 56 is disposable within the bore in base plate 26 adjacent to weights 30, and is releasably suspended therein, as by a frictional collar, detent, or the like, in such a way that simulated injector 56 may be driven downwards and out of base plate 26 when struck by weights 30. The lower end of simulated injector 56 exactly duplicates in size and shape an actual fuel injector for use with fuel rail 16, including a circumferential O-ring 58.

In operation, the simulated fuel injector 56 is disposed below weights 30. The actuating element is manually rotated via knob 48 to raise weights 30 and to bring cam follower 38 to detent position 52 on edge 46. Clamp 42 is adjusted to position the bottom of weights 30 at a desired, predetermined distance above injector 56. A desired, predetermined total weight is placed on assembly rod 32. A fuel rail 16 having a gland 18 to be tested is positioned on supporting means 14 with the test gland centered under simulated injector 56.

To test the gland for acceptable plating thickness on the inner wall thereof, an operator moves knob 48 to the right (in FIG. 1), moving edge surface 46 supporting cam follower 38 past detent portion 52 to vertical portion 54, thereby allowing weights 30 to fall freely under gravity and to strike the upper end of simulated injector 56. Injector 56 becomes detached from base plate 26 and accelerated thereby towards gland 18. The trajectory of the weights is arrested by base plate 26, while the accelerated injector 56 flies free as a projectile toward gland 18.

The total weights and height of the weights are selected to impart a desired kinetic force to injector 56 at the moment it strikes the gland. This force is the same as, or preferably slightly less than, the force exerted on a real injector on a real assembly line. For a known combination of fuel injector and gland, it has been found empirically that insertion forces greater than about 5 pounds can be damaging to the gland and/or the O-ring. Thus, for this combination, a failure of the simulated injector to insert properly into the gland at a force of 5 pounds is cause for rejection of the fuel rail; proper insertion is cause for acceptance. Following a test, the simulated fuel injector is recovered and reinserted into the apparatus in preparation for the next test.

In a typical quality assurance program on a production line wherein fuel rails having glands already assembled thereto are plated, it has been found that testing of one gland selected from every seventy-second fuel rail can provide an adequate level of plating line control and release testing.

Drop tester 10 is readily adjusted to provide other force values as may be required to test other combinations of fuel injectors and glands for other engines, simply by adjusting the total weight and the height of the weights. The tester is thus highly versatile.

Use of the drop tester eliminates the uncertainty currently associated with the assembly of fuel injectors to plated fuel rails. It provides platers with a low cost, accurate, and robust measurement system for controlling their plating processes and for protecting the interests of their customers.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A tester for a seal gland on a fuel rail or an internal combustion engine, said gland being tested to assure later entry of an actual fuel injector thereinto and into like glands in other fuel rails in a subsequent manufacturing step, comprising:

a) means for supporting said fuel rail and for positioning said gland to be tested;

b) a simulated fuel injector for attempted insertion into said gland;

c) means for releasably suspending said simulated fuel injector above said positioned gland; and d) means for releasing said simulated fuel injector and for driving said simulated fuel injector toward said positioned gland at a predetermined velocity such that said simulated fuel injector attempts to enter said gland with a predetermined kinetic energy.

2. A seal gland tester as in claim 1 wherein said means for releasing and driving said simulated fuel injector comprises:

a) an elongate barrel supported above said simulated fuel injector and substantially coaxial therewith;

b) a weight slidably disposed in said barrel and engageable with said simulated fuel injector;

c) means for suspending said weight in said barrel at a distance above said simulated fuel injector; and d) means for releasing said suspended weight to cause said weight to fall under gravity and to strike said simulated fuel cell.

3. A seal gland tester in accordance with claim 2 wherein said means for suspending said weight in said barrel comprises:

a) a longitudinal slot in said barrel;

b) an actuation rod connected to said weight and extending outward through said slot; and c) means for supporting said actuation rod outside said barrel to suspend said weight within said barrel.

4. A seal gland tester in accordance with claim 3 wherein said means for supporting said actuation rod comprises:

a) a tubular actuation element disposed coaxially of said barrel on an outer surface thereof and rotatable thereabout;

b) an upper edge on said element defining a rotary cam surface; and c) a cam follower mounted on said actuation rod and disposed on said cam surface, said cam surface being helically inclined over a portion of its length such that rotation of said element raises said weight to a height above said simulated fuel injector.

5. A seal gland tester in accordance with claim 4 wherein said cam surface further includes a detent portion.

6. A seal gland tester in accordance with claim 5 wherein said means for releasing said suspended weight comprises a vertical portion of said cam surface wherein said cam follower is not supported by said surface and said weight is free to fall under gravity to strike said simulated fuel injector.

7. A seal gland tester in accordance with claim 6 wherein the total of said weight in said barrel may be varied.

8. A seal gland tester in accordance with claim 4, wherein said means for supporting said actuation rod further includes a releasable clamp disposed on said barrel for supporting said actuation element at any desired axial position along said barrel whereby said height of said weights may be varied.

9. A method for testing the capability of a fuel rail seal gland to receive a fuel injector, comprising the steps of:

a) positioning said seal gland to be tested;

b) releasably suspending a simulated fuel injector above said seal gland; and c) releasing said suspended simulated fuel injector and driving said simulated fuel injector toward said positioned gland at a predetermined velocity such that said simulated fuel injector attempts to enter said gland with a predetermined kinetic energy.

10. A seal gland tester as in claim 1 wherein said means for supporting said fuel rail further comprises at least two towers.

11. A seal gland tester as in claim 2 wherein said weight slidably disposed in said barrel further comprises a stack of weights.

12. A method for testing the capability of a fuel rail seal gland to receive a fuel injector as in claim 9, wherein said simulated fuel injector flies free as a projectile toward said positioned gland.

* * * * *